(12) United States Patent
Beringer

(10) Patent No.: US 11,577,824 B2
(45) Date of Patent: Feb. 14, 2023

(54) LANDING GEAR FOR AN AIRCRAFT WEIGHING LESS THAN 5.7 TONNES

(71) Applicant: Beringer Aero, Tallard (FR)

(72) Inventor: Gilbert Beringer, Fouillouse (FR)

(73) Assignee: Beringer Aero, Tallard (FR)

( * ) Notice: Subject to any disclaimer, the term of this patent is extended or adjusted under 35 U.S.C. 154(b) by 74 days.

(21) Appl. No.: 16/973,777

(22) PCT Filed: Jul. 3, 2019

(86) PCT No.: PCT/FR2019/051652
§ 371 (c)(1),
(2) Date: Dec. 10, 2020

(87) PCT Pub. No.: WO2020/012093
PCT Pub. Date: Jan. 16, 2020

(65) Prior Publication Data
US 2021/0245868 A1 Aug. 12, 2021

(30) Foreign Application Priority Data
Jul. 12, 2018 (FR) ........................................ 1856454

(51) Int. Cl.
*B64C 25/36* (2006.01)
*B64C 25/60* (2006.01)
*B64C 25/62* (2006.01)

(52) U.S. Cl.
CPC .............. *B64C 25/36* (2013.01); *B64C 25/60* (2013.01); *B64C 25/62* (2013.01)

(58) Field of Classification Search
CPC ......... B64C 25/36; B64C 25/58; B64C 25/60; B64C 25/62
See application file for complete search history.

(56) References Cited

U.S. PATENT DOCUMENTS

| | | | | |
|---|---|---|---|---|
| 1,600,154 A | * | 9/1926 | Van Vliet | B64C 25/62 |
| | | | | 114/283 |
| 2,218,370 A | * | 10/1940 | Hojnowski | B64C 25/02 |
| | | | | 244/104 CS |
| 2,597,265 A | * | 5/1952 | Salter | B64C 25/62 |
| | | | | 267/47 |
| 2017/0217574 A1 | * | 8/2017 | Dufault | B64C 25/62 |

FOREIGN PATENT DOCUMENTS

FR 634725 2/1928

OTHER PUBLICATIONS

Rapport de Recherche Internationale et l'Opinion Ecrite [International Search Report and the Written Opinion] dated Nov. 4, 2019 From the International Searching Authority re. Application No. PCT/FR2019/051652. (10 Pages).
Rapport de Recherche Preliminiaire et Opinion Ecrite [Preliminary Search Report and Written Opinion] dated May 27, 2019 From the Institut National de la Propriete Industrielle, INPI, Republique Francaise Re. Application No. FR 1856454. (6 Pages).

\* cited by examiner

*Primary Examiner* — Tye William Abell

(57) ABSTRACT

The present invention concerns a landing gear (1) for a light aircraft, i.e. weighing less than 5.7 tonnes, the landing gear consisting of at least one wheel (3) attached to a chassis or to a fuselage of the aircraft by means of a connecting element (2). According to the invention, the wheel (3) is connected to the connecting element (2) via a system (4) of two damping cylinders arranged between the wheel (3) and the connecting element (2).

4 Claims, 3 Drawing Sheets

LANDING GEAR FOR AN AIRCRAFT WEIGHING LESS THAN 5.7 TONNES

RELATED APPLICATIONS

This application is a National Phase of PCT Patent Application No. PCT/FR2019/051652 having International filing date of Jul. 3, 2019, which claims the benefit of priority of French Patent Application No. 1856454 filed on Jul. 12, 2018. The contents of the above applications are all incorporated by reference as if fully set forth herein in their entirety.

FIELD AND BACKGROUND OF THE INVENTION

The invention relates to the technical sector of general aviation, i.e. for example aircraft of ULM type, or more generally aircraft weighing less than 5.7 tonnes. More specifically, the invention relates to a landing gear for this type of aircraft.

A landing gear for aircraft in the field of general aviation, in the form of a strip-based landing gear, is known from the prior art. In other words, the landing gear consists of at least one wheel fixed to a chassis or to a fuselage of the aircraft via a connecting element which is in the form of a flexible and damping strip.

While this strip-based landing gear affords a certain degree of damping, it is unsatisfactory.

There are other types of landing gear, in particular a landing gear of the type consisting of a tubular connecting element, extending from the fuselage in an inclined or vertical manner, and directly attached to the wheel. This type of landing gear has no damping ability.

A landing gear for light aircraft for general aviation, comprising a fixed tubular reinforcement of general triangular shape, the apex of which is turned downwards, and a flat vertical reinforcement, at the lower end of which a plate is attached, under the apex of the tubular reinforcement, is also known, for example from document U.S. Pat. No. 2,233,191. The ends of the base of the tubular reinforcement and the plate attached to the flat reinforcement are coupled, with articulation capability, to a suspension system connected to the wheels. Each end of the base of the tubular reinforcement is angularly coupled to a wheel by means of a damping member, whereas the plate attached to the flat reinforcement is connected to each wheel by a relatively thin torsion strut.

This structure makes it possible to produce satisfactory damping but is relatively complex to implement.

Landing gears are also known with a torque link damping system; according to this technique, the element for connecting to the chassis is connected to a damping cylinder which is in turn connected to the wheel, and to a torque link system, i.e. a system of two arms articulated relative to one another, one of which is connected to the wheel and the other of which is connected to the strut of the damping cylinder.

This device is entirely satisfactory in terms of damping, but requires the complex arrangement of the torque link, in particular for guiding the wheel in rotation about a vertical axis.

SUMMARY OF THE INVENTION

One of the aims of the invention therefore is to propose a landing gear for light aircraft, i.e. aircraft included in the field of general aviation, in particular weighing less than 5.7 tonnes, the design of which is simple, safe and rational, which is fitted with a satisfactory damping system while making it possible to be able to guide, in an equally simple manner, the rotation of the wheel about a vertical axis.

To this end, a landing gear for a light aircraft, i.e. weighing less than 5.7 tonnes, has been developed, consisting of at least one wheel attached to a chassis or to a fuselage of the aircraft by means of a connecting element.

According to the invention, the wheel is connected to the connecting element via a system of two damping cylinders arranged between the wheel and the connecting element.

In this way, the invention makes it possible to provide a landing gear fitted with an optimal damping function. Moreover, the fact that the wheel is connected directly to the connecting element and only via the system of two damping cylinders makes it possible to simplify the design of the landing gear, and makes it possible to easily ensure the guiding of the wheel in rotation about a vertical axis, because the system comprises two damping cylinders.

According to a particular embodiment, the system of two damping cylinders is composed of two rods extending from a support part attached to an axle of the wheel, and of two struts mounted with the ability for damped sliding around the rods and secured to the connecting element.

Preferably, the two tubes of the system of damping cylinders are secured to the connecting element via a connecting part attached to the connecting element and connecting the two struts to one another.

The invention is applicable to any type of landing gear consisting of at least one wheel attached to the chassis or to the fuselage of the aircraft by a connecting element. For example, the connecting element may be in the form of a strip, in particular for strip-based landing gears, or else in the form of a tube which may for example be attached to the aircraft vertically or else in an inclined manner.

When the connecting element is in the form of a strip, the connecting part comprises a mounting plate for attachment to the strip, located between the struts of the system of damping cylinders, which plate is attached to holes that the strip originally has and which were provided for attaching to the axle of the wheel.

Thus, it is therefore possible to equip the strip-based landing gears of the prior art with a system of two damping cylinders in order to obtain a landing gear according to the invention.

According to a particular embodiment, the support part is in the form of a fork with two arms which are attached on either side of the wheel, connected by a spacer from which the two rods extend.

Moreover, and in order to further facilitate adaptation to existing landing gears, the support part comprises a mounting plate for attachment to the axle of the wheel, located between the struts, and which is attached to holes that the axle originally has and which were provided for attaching to the connecting element.

The damping cylinders are of any suitable type, and may for example be spring, pneumatic or hydraulic cylinders.

According to a particular embodiment, the support part is attached by crimping and bolting to the rods of the system of two damping cylinders.

BRIEF DESCRIPTION OF THE SEVERAL VIEWS OF THE DRAWINGS

Other advantages and technical features of the invention will emerge better from the following description of a preferred embodiment of the landing gear, provided as a non-limiting example based on the appended figures, in which.

DESCRIPTION OF SPECIFIC EMBODIMENTS OF THE INVENTION

Figure 1:
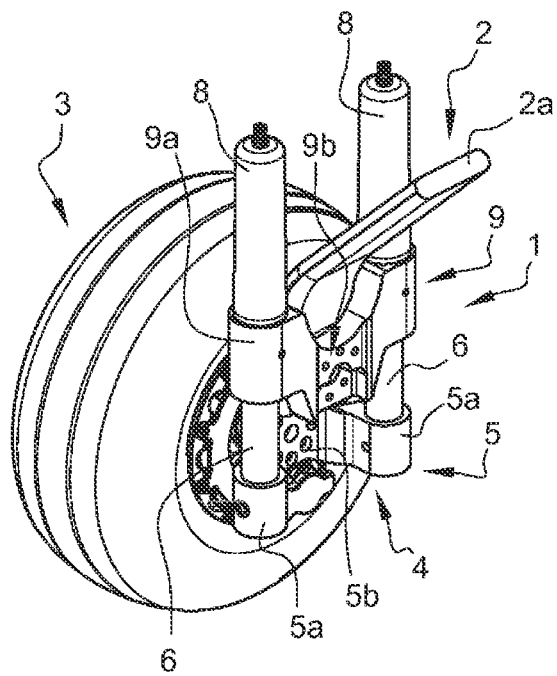
FIG. 1 is a partial perspective view of a first embodiment of a landing gear according to the invention, illustrating a system of two damping cylinders arranged between a wheel and an element for connecting to the chassis of an aircraft in the form of a strip, the system being in the expanded position.
Figure 2:
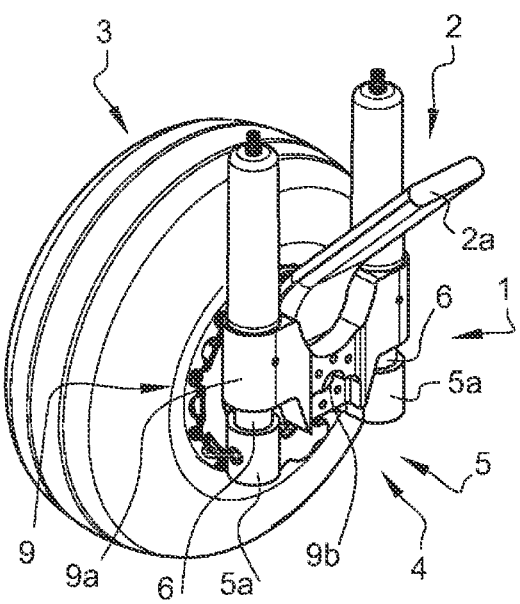
FIG. 2 is a similar view to that of FIG. 1, the system of two damping cylinders being in the compressed position.
Figure 3:
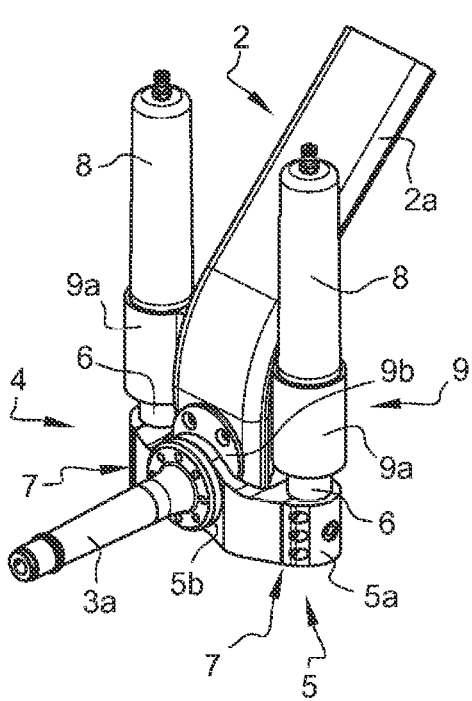
FIG. 3 is a similar view to that of FIG. 2, without the wheel, making way for the axle of the wheel.

The invention relates to a landing gear (1) for a light aircraft, i.e. for an aircraft included in the category of general aviation, in particular weighing less than 5.7 tonnes.

Generally speaking, the landing gear (1) comprises a connecting element (2) connecting a wheel (3) to the chassis or to the fuselage of the aircraft. The landing gear (1) according to the invention is equally well suited to the front wheel (3) of the aircraft and to the two back wheels (3).

From the preceding, according to particular embodiments, the connecting element (2) may be in the form of a flexible strip (2a) or else a tubular element (2b), connecting the wheel (3) vertically or in an inclined manner to the chassis or to the fuselage of the aircraft.

According to the invention, the wheel (3) of the landing gear (1) is connected to the connecting element (2) via a system (4) of two damping cylinders arranged between the wheel (3) and the connecting element (2). In other words, it is the system (4) of two damping cylinders which performs the structural and mechanical connection between the wheel (3) and the element for connecting (2) to the chassis. The damping properties are therefore optimal.

In a known way, the wheel (3) of the landing gear (1) comprises a tire, a rim, a yoke and an axle (3a) forming the axis of rotation of the wheel (3).

Several embodiments can be contemplated starting from the basic principle of the invention.

According to a first particular embodiment illustrating a strip-based (2a) landing gear, and with reference to FIGS. 1 to 4, the system (4) of two damping cylinders comprises a support part (5) attached to one side of the axle (3a) of the wheel (3).

According to this first embodiment, the support part (5) comprises two end sleeves (5a), parallel to one another, and connected by a mounting plate (5b) for attachment to the axle (3a). The two end sleeves (5a) each receive a rod (6) of the system (4) of two damping cylinders, and are attached to the latter by crimping and bolting. To this end, each sleeve (5a) has a radial slot (7) to enable the clamping and crimping of the rods (6). The two rods (6) are therefore at a distance from one another and receive, with the ability for damped sliding, struts (8) also constituting the system (4) of two damping cylinders. The struts (8) are connected to one another by a connecting part (9) attached to the strip (2a) constituting the element for connecting (2) to the chassis of the aircraft.

Figure 4:
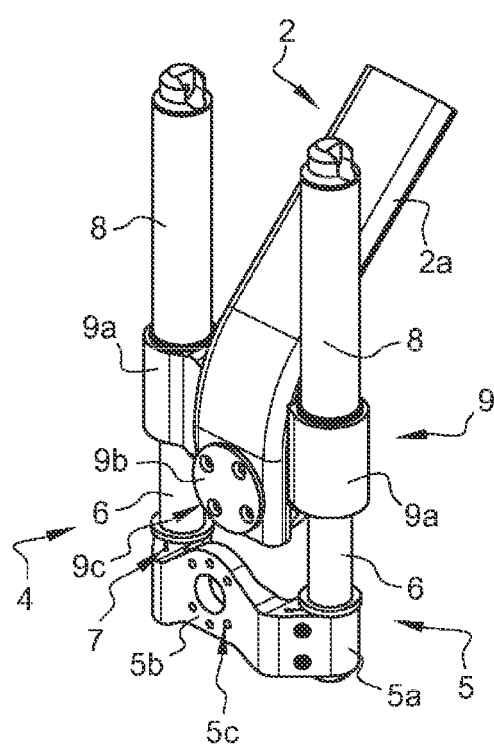
FIG. 4 is a similar view to that of FIG. 1, without the wheel or the axle.

Moreover, and referring to FIG. 4, and preferably, the mounting plate (5b) of the support part (5) has holes (5c) intended to cooperate with holes that the axle (3a) originally has for attaching to the connecting element (2). Thus, the mounting plate (5b) of the support part (5) is directly attached to the axle (3a) without requiring any modification.

In the same way as for the support part (5), the connecting part (9) comprises two end sleeves (9a), parallel to one another, and connected by a mounting plate (9b) for attachment to the strip (2a). The sleeves (9a) receive the struts (8) of the damping cylinders, and the plate (9b) comprises holes (9c) intended to cooperate with holes that the strip (2a) originally has for attaching to the axle (3a) of the wheel (3). Thus, the connecting part (9) is directly attached to the strip (2a), without requiring modification of the strip (2a).

Thus, the invention makes it possible to connect, simply and with optimal damping ability, the wheel (3) of an aircraft to the element for connecting (2) to the chassis or to the fuselage of the aircraft. Moreover, the system (4) of two damping cylinders also makes it possible to guide the wheel (3) in rotation about a vertical axis.

Figure 5:
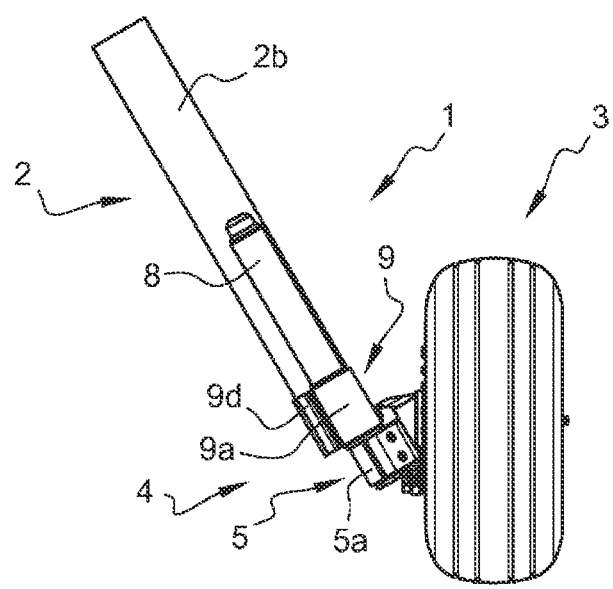
FIG. 5 is a partial perspective view of a second embodiment of a landing gear according to the invention, illustrating a system of two damping cylinders arranged between a wheel and an element for connecting to the chassis of an aircraft in the form of an inclined tube, the system being in the compressed position.
Figure 6:
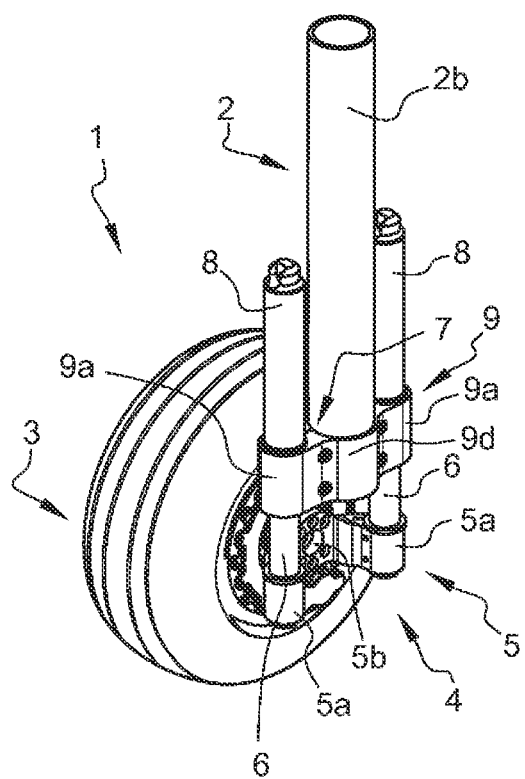
FIG. 6 is a partial perspective view of a third embodiment of a landing gear according to the invention, illustrating a system of two damping cylinders arranged between a wheel and an element for connecting to the chassis of an aircraft in the form of a vertical tube, the system being in the expanded position.
Figure 7:
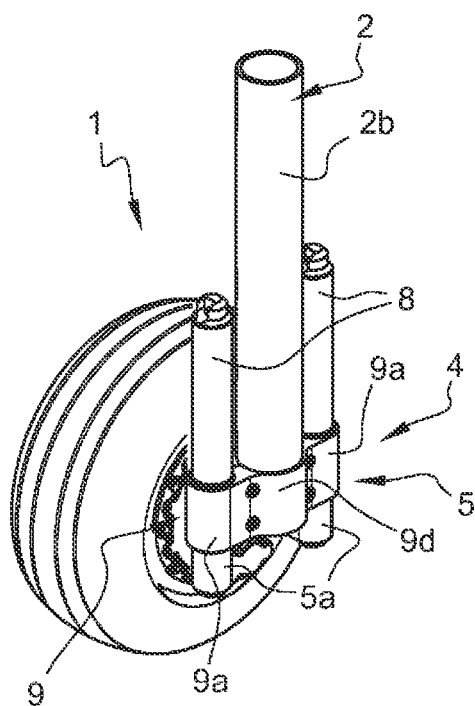
FIG. 7 is a similar view to that of FIG. 6, the system of two damping cylinders being in the compressed position.

In the case in which the connecting element (2) is in the form of an inclined tube (2b) according to a second embodiment as illustrated in FIG. 5, or of a vertical tube (2b) according to a third embodiment as illustrated in FIGS. 6 and 7, the connecting part (9) has, instead of the plate (9b), a central sleeve (9d), parallel to the end sleeves (5a), and intended to be fitted on around the tube (2b) and be attached thereto, for example by crimping and bolting, in combination with at least one radial slot (7) provided in the central sleeve (9d). The connecting part (9) is thus easily attached to the tubes (2b) of existing landing gears. The tube (2b) constituting the connecting element (2) may be produced from carbon.

Preferably, the connecting part (9) is also attached to the struts (8) of the damping cylinders by crimping and bolting, in combination with radial slots (7) also provided in the end sleeves (5a), for example communicating with those of the central sleeve (9d).

Of course, it is clear that other means for attaching the connecting part (9) or the support part (5) may be contemplated without departing from the scope of the invention.

Figure 8:
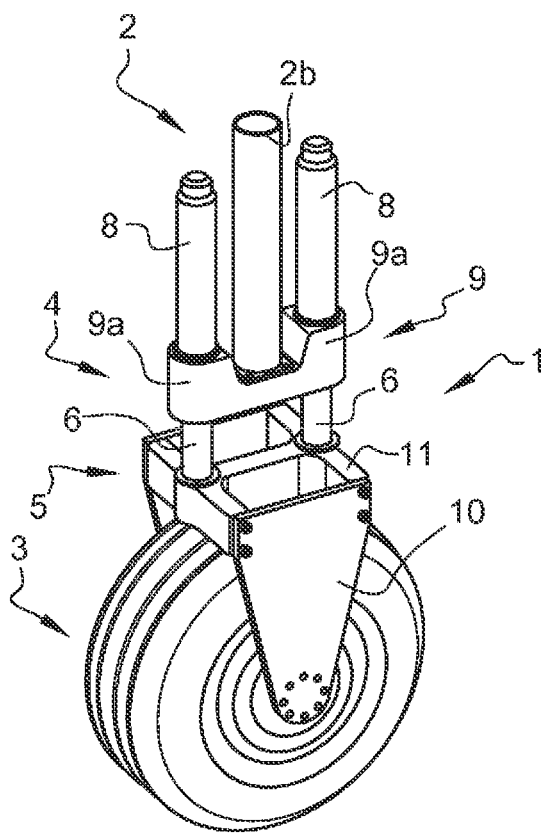
FIG. 8 is a partial perspective view of a fourth embodiment of a landing gear according to the invention, illustrating a system of two damping cylinders mounted on a fork and arranged between a wheel and an element for connecting to the chassis of an aircraft in the form of a vertical tube, the system being in the expanded position.
Figure 9:
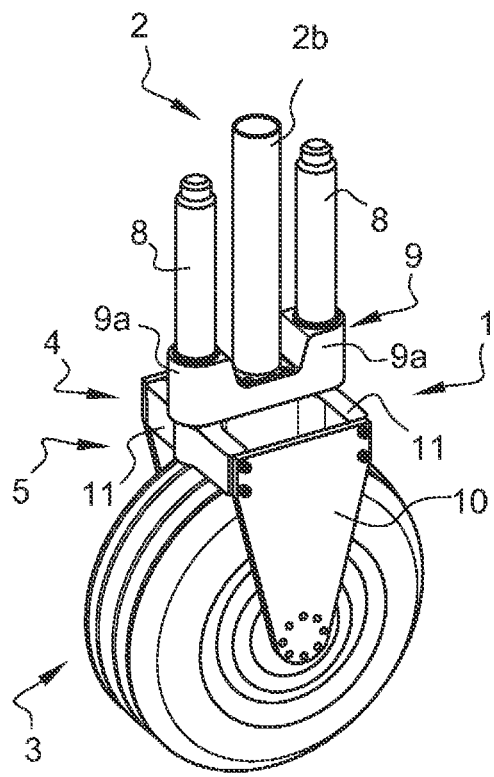
FIG. 9 is a similar view to that of FIG. 8, the system of two damping cylinders being in the compressed position.

Referring to FIGS. 8 and 9, a fourth embodiment has been contemplated. In this embodiment, the support part (5) is in the form of a fork with two arms (10) attached to the axle (3a), on either side of the wheel (3). The arms (10) are connected by a spacer (11) from which the two rods (6) of the system (4) of two damping cylinders extend, for example received in sleeves of the same type as the sleeves (5a) described above.

In this embodiment, the connecting part (9) does not have a central sleeve (9d), the tube constituting the connecting element (2) extends directly from the connecting part (9) and is attached thereto via mounting screws for example. Of course, this embodiment may be transposed to the embodiments of FIGS. 5 to 7, implementing a tube (2d) as connecting element (2). Conversely, the embodiment of the connecting part (9) with the central sleeve (9d) may be transposed to the embodiment of FIGS. 8 and 9.

It emerges from the foregoing that the invention indeed provides a landing gear (1) equipped with a damping system (4), in particular arranged between the wheel (3) and the connecting element (2), which has a simple design and which makes it possible to guide the wheel (3) of the landing gear (1) in rotation about a vertical axis.

The invention thus makes it possible to disassociate the functions of resistance from those of guidance and load distribution.

What is claimed is:

1. A landing gear (1) for an aircraft weighing less than 5.7 tonnes, the landing gear consisting of at least one wheel (3) attached to a chassis or to a fuselage of the aircraft by means of a connecting element (2), wherein the wheel (3) is connected to the connecting element (2) via a system (4) of two damping cylinders arranged between the wheel (3) and the connecting element (2), the system (4) of two damping cylinders is composed of two rods (6) extending from a support part (5) attached to an axle (3a) of the wheel (3), and of two struts (8) mounted with the ability for damped sliding around the rods (6) and secured to the connecting element (2), the two struts (8) are secured to the connecting element (2) via a connecting part (9) attached to the connecting element (2) and connecting the two struts (8) to one another, wherein the connecting element is in the form of a strip and the connecting part comprises a mounting plate for attachment to the strip, located between the struts, and which is attached to holes that the strip originally has for attaching to the axle of the wheel.

2. The landing gear (I) according to claim 1, wherein the support part (5) comprises a mounting plate (5b) for attachment to the axle (3a) of the wheel (3), located between the rods (6), and which is attached to holes that the axle (3a) originally has for attaching to the connecting element (2).

3. The landing gear (1) according to claim 1, wherein the cylinders of the system (4) of two damping cylinders are spring, pneumatic or hydraulic cylinders.

4. The landing gear (1) according to claim 1, herein the support part (5) is attached by crimping and bolting to the rods (6) of the system (4) of two damping cylinders.

* * * * *